(12) United States Patent
Kim

(10) Patent No.: US 8,983,381 B2
(45) Date of Patent: Mar. 17, 2015

(54) MULTI-MODE SHORT-RANGE WIRELESS SIGNAL PROCESSING APPARATUS AND METHOD

(75) Inventor: Sang Don Kim, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 205 days.

(21) Appl. No.: 13/293,448

(22) Filed: Nov. 10, 2011

(65) Prior Publication Data
US 2012/0122399 A1 May 17, 2012

(30) Foreign Application Priority Data

Nov. 12, 2010 (KR) .......................... 10-2010-0112853

(51) Int. Cl.
| | | |
|---|---|---|
| H04B 7/00 | (2006.01) | |
| H04W 76/02 | (2009.01) | |
| H04W 8/00 | (2009.01) | |

(52) U.S. Cl.
CPC ............ *H04W 76/023* (2013.01); *H04W 8/005* (2013.01)
USPC .......... 455/41.2; 455/41.1; 455/41.3; 455/92; 455/99; 455/297

(58) Field of Classification Search
CPC .......... G05B 13/02; G01C 21/00; H04B 7/00; H04B 7/14; H04B 3/36
USPC ........ 455/41.1, 92, 99, 297, 456.1, 41.2, 41.3
See application file for complete search history.

(56) References Cited

U.S. PATENT DOCUMENTS

| | | | | |
|---|---|---|---|---|
| 7,099,751 | B2 * | 8/2006 | DePrez et al. | 701/2 |
| 7,336,929 | B2 * | 2/2008 | Yasuda et al. | 455/41.2 |
| 7,532,872 | B2 * | 5/2009 | Lazzarotto et al. | 455/226.1 |
| 2002/0098835 | A1 * | 7/2002 | Flick | 455/420 |
| 2002/0197954 | A1 * | 12/2002 | Schmitt et al. | 455/41 |
| 2005/0097241 | A1 * | 5/2005 | Lee | 710/32 |
| 2005/0168373 | A1 * | 8/2005 | Mukaida | 341/176 |
| 2005/0287920 | A1 * | 12/2005 | Lucas et al. | 446/454 |
| 2006/0082221 | A1 * | 4/2006 | Mouzas | 307/10.1 |
| 2006/0155431 | A1 * | 7/2006 | Berg et al. | 701/2 |

(Continued)

FOREIGN PATENT DOCUMENTS

| | | | | |
|---|---|---|---|---|
| KR | 1020060002631 | | 1/2006 | |
| KR | 1020060002631 | * | 9/2006 | ............... H04B 1/40 |

(Continued)

*Primary Examiner* — Wesley Kim
*Assistant Examiner* — Md Talukder
(74) *Attorney, Agent, or Firm* — Cha & Reiter, LLC

(57) ABSTRACT

An apparatus and method are provided for receiving and processing a control signal and/or a data signal through a short-range wireless communication. The wireless signal processing apparatus preferably includes a connection detection unit that detects a connection of a peripheral device, and a communication unit that receives the control signal and the data signal from a client device through the short-range wireless communication. A data processing unit sends the received data signal to the peripheral device, and a mode control unit for controlling the communication unit to send the received data signal to the data processing unit when the connection detection unit detects the connection of the peripheral device. The apparatus and method may be utilized for various purposes on the basis of the short-range wireless communication, depending on whether or not the peripheral device is connected.

19 Claims, 5 Drawing Sheets

(56) References Cited

U.S. PATENT DOCUMENTS

| | | | |
|---|---|---|---|
| 2007/0035412 A1* | 2/2007 | Dvorak et al. | 340/825.69 |
| 2007/0238491 A1* | 10/2007 | He | 455/569.2 |
| 2009/0002066 A1* | 1/2009 | Lee et al. | 327/554 |
| 2009/0248913 A1* | 10/2009 | Salokannel | 710/33 |
| 2010/0036600 A1* | 2/2010 | Shinmyoh et al. | 701/200 |
| 2010/0093275 A1* | 4/2010 | Yoshino et al. | 455/14 |
| 2010/0273417 A1* | 10/2010 | Tian et al. | 455/41.2 |
| 2011/0237186 A1* | 9/2011 | Preissinger et al. | 455/41.1 |
| 2012/0122399 A1* | 5/2012 | Kim | 455/41.2 |
| 2012/0244876 A1* | 9/2012 | Park et al. | 455/456.1 |
| 2014/0309814 A1* | 10/2014 | Ricci et al. | 701/2 |

FOREIGN PATENT DOCUMENTS

| | | |
|---|---|---|
| KR | 1020070071877 | 7/2007 |
| KR | 1020090020845 | 2/2009 |

* cited by examiner

MULTI-MODE SHORT-RANGE WIRELESS SIGNAL PROCESSING APPARATUS AND METHOD

CLAIM OF PRIORITY

This application claims the right of priority under 35 U.S.C. §119 from Korean Patent Application No. 10-2010-0112853 filed on Nov. 12, 2010 the contents of which are hereby incorporated by reference in its entirety.

BACKGROUND OF THE INVENTION

1. Field of the Invention

The present invention relates generally to wireless signal processing apparatus and method. More particularly, the present invention relates to an apparatus and method for receiving and processing a control signal and/or a data signal through a short-range wireless communication.

2. Description of the Related Art

A short-range wireless communication refers to a communication comprising the exchange of information between information processing devices within a relatively short distance, using a radio wave as a transmission medium of information. In the past, a short-range communication was limited to a wired communication that required a wire connection between communication devices. However, due to some merits of a wireless communication, such as mobility, easiness of installation and expansion, etc., a short-range wireless communication has been developed and become widely used in these days.

Some examples of a short-range wireless communication protocol includes Bluetooth, NFC (Near Field Communication), ZigBee, RuBee, a wireless LAN (Local Area Network), and the like. Nowadays, data transmission/reception technologies using these above-mentioned short-range wireless communication protocols have become increasingly popular.

For instance, Bluetooth technology is currently used in several fields such as a Bluetooth-based data transmission, a Bluetooth earphone, a Bluetooth earset, and a Bluetooth-based device control. Nevertheless, there is still much room for expansion toward other fields.

SUMMARY OF THE INVENTION

Accordingly, the present invention provides a wireless signal processing apparatus and method that is able to be utilized for various purposes on the basis of a short-range wireless communication, which is not dependent upon a connection to a particular peripheral device.

According to one exemplary aspect of the present invention, a wireless signal processing apparatus using a short-range wireless communication preferably comprises a connection detection unit configured to detect a connection (i.e. coupling) with a peripheral device; a communication unit configured to receive a control signal and a data signal from a client device through the short-range wireless communication; a unit configured to send the received data signal to the peripheral device; and a mode control unit configured to control the communication unit to send the received data signal to the data processing unit when the connection detection unit detects the connection of the peripheral device.

According to another exemplary aspect of the present invention, a wireless signal processing method for a short-range wireless communication in a wireless signal processing apparatus, in which the method preferably includes: determining whether a peripheral device is connected for communication; when a connection of the peripheral device is detected, receiving a data signal by a controller and transmitting the received data signal to the peripheral device.

Other exemplary aspects, advantages, and salient features of the presently claimed invention will become apparent to those skilled in the art from the following detailed description, which, taken in conjunction with the annexed drawings, discloses exemplary embodiments of the invention.

DETAILED DESCRIPTION

Exemplary, non-limiting embodiments of the present invention will now be described more fully with reference to the accompanying drawings. This invention may, however, be embodied in many different forms and the appended claims should not be construed as limited to the exemplary embodiments set forth herein. Rather, the disclosed exemplary embodiments are provided so that this disclosure will be thorough and complete, and will fully convey the scope of the claimed invention to those skilled in the art. The principles and features of the claimed invention may be employed in varied and numerous exemplary embodiments without departing from the scope of the invention.

Furthermore, well known or widely used techniques, elements, structures, and processes may not be described or illustrated in detail to avoid obscuring appreciation of the present invention by a person of ordinary skill in the art with descriptions of such well-known techniques, elements, structures and processes. Although the drawings represent exemplary embodiments of the invention, the drawings are not necessarily to scale and certain features may be exaggerated or omitted in order to better illustrate and explain the presently claimed invention.

Figure 1:
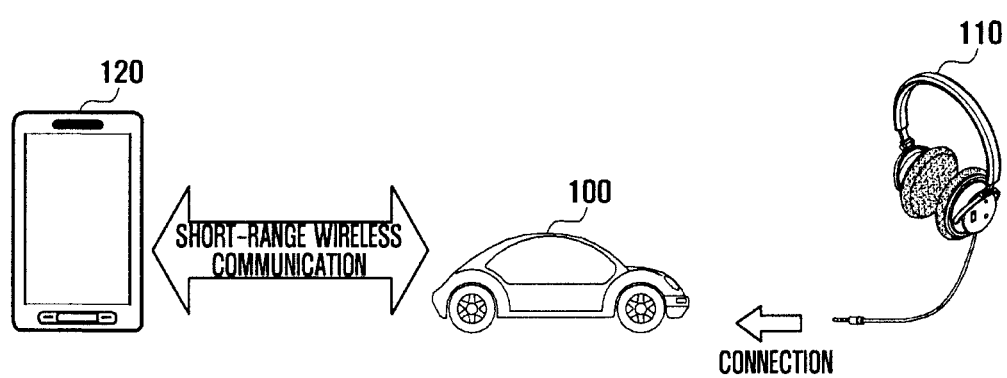
FIG. 1 is a schematic view illustrating the configuration of a wireless signal processing system in accordance with an exemplary embodiment of the present invention.

FIG. 1 is a schematic view illustrating the configuration of a wireless signal processing system in accordance with an exemplary embodiment of the present invention.

Referring now to FIG. 1, the system according to an exemplary embodiment of this invention preferably includes a peripheral device 110, a client device 120, and a wireless signal processing apparatus 100 (hereinafter, shortly referred to as 'apparatus').

The client device 120, (i.e. user device, which may comprise, for example, a portable communication terminal) sends and receives to/from the apparatus 100 a control signal and a data signal via a short-range wireless communication. The client device 120 may be a wide variety of devices, including but not limited to, for example, a smart phone, for example, having a Bluetooth communication function. In the client device 120, in an exemplary embodiment a music playback application and a remote control application may be installed.

When a user gives a command to execute the music playback application, the client device 120 decodes a music file and then sends a resultant audio signal to the apparatus 100 through a Bluetooth communication. The resultant audio signal can be provided to a peripheral device 110 such as a headset, loudspeaker, etc. Additionally, when a user gives a command to execute the remote control application, the client device 120 may convert a user's control input into a control signal and then send the control signal to the apparatus 100 through a Bluetooth communication. The client device 120 may comprise a single device, as illustrated, or may comprise a number of different devices that separately perform the music playback application and the remote control application. Meanwhile, besides smart phones, any other various types of devices that send a data signal or a control signal to the apparatus 100 through a short-range wireless communication such as a Bluetooth communication may be used as the client device 120.

The peripheral device 110 is preferably a device that can be connected to the apparatus 100. When the peripheral device 110 is connected to the apparatus 100, the peripheral device 110 receives a data signal from the apparatus 100. For instance, the peripheral device 110 may comprise a headset that converts the data signal received from the apparatus 100 into sound and then offers it to a user. In other exemplary embodiments, the peripheral device 110 may include a great variety of devices that receive a data signal from the apparatus 100 and then offer it to a user or store it therein.

The apparatus 100 preferably includes a terminal (i.e., a device connection unit) to which the peripheral device 110 can be connected (i.e. coupled for communication). If the peripheral device 110 is connected to the apparatus 100, the apparatus 100 enters into a data receive mode that allows for receiving a data signal from the client device 120. In the data receive mode, the apparatus 100 converts the received data signal into a specific format adapted to the peripheral device 110 and then sends (transmits) the data to the peripheral device 110. A data signal may comprise an audio data signal, a video data signal, or any other kinds of data signal. If the peripheral device 110 is not connected to the apparatus 100 for communication, the apparatus 100 enters into a control receive mode that allows for receiving a control signal from the client device 120. In the control receive mode, the apparatus 100 receives a control signal and then performs a control function according to the received control signal. For instance, the apparatus 100 may comprise an apparatus having the function of a wirelessly controlled car. In such a case, the received control signal may include a steering signal, a speed control signal, and a lamp on/off signal. According to these signals, the apparatus 100 may control a direction, regulate a speed, or turn on/off a lamp of apparatus 100. Detailed configuration and operation of the apparatus 100 will be described with further reference to FIGS. 2 to 4.

Figure 2:
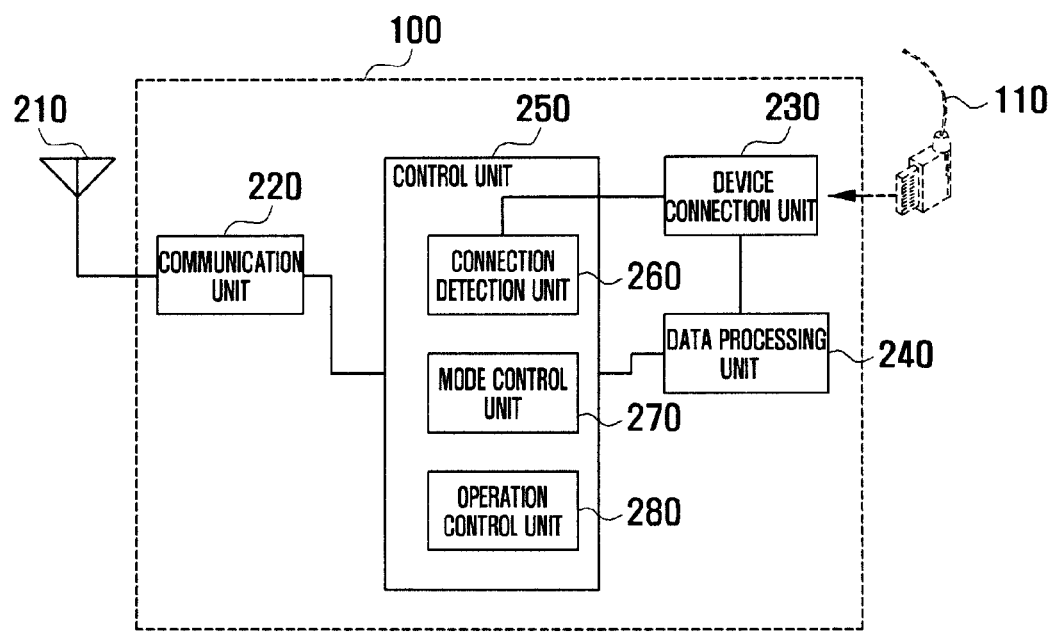
FIG. 2 is a block diagram illustrating the configuration of a wireless signal processing apparatus in accordance with an exemplary embodiment of the present invention.

FIG. 2 is a block diagram illustrating an exemplary configuration of a wireless signal processing apparatus in accordance with an exemplary embodiment of the present invention.

Referring now to FIG. 2, the apparatus 100 preferably includes an antenna 210, a communication unit 220, a device connection unit 230, a data processing unit 240, and a control unit 250 (i.e. controller, processor, microprocessor). In particular, the control unit 250 includes a connection detection unit 260, a mode control unit 270, and an operation control unit 280.

The antenna 210 receives and converts a wireless signal input and then delivers it to the communication unit 220. Also, the antenna 210 converts a signal received from the communication unit 220 into a wireless signal and then generates a radio wave output.

The communication unit 220 receives a control signal or a data signal through a short-range wireless communication. Also, the communication unit 220 sends the received signal to the operation control unit 280 or the data processing unit 240. The types of signals the communication unit 220 receives or processes may be varied according to the control of the mode control unit 270. Related descriptions will be made later in connection with the mode control unit.

A user may connect or disconnect the peripheral device 110 to or from the device connection unit 230, as needed. Preferably, the device connection unit 230 acts as an interface and has a structure adapted to couple with the peripheral device 110, such as a 20-pin standard terminal for an earphone (or a headphone, headset, earset, etc.), a 3.5 mm earphone jack, just to name a few possibilities. After being mechanically and electrically connected to the device connection unit 230, the peripheral device 110 sends and receives data to and from the apparatus 100 through the device connection unit 230.

The connection detection unit 260 detects a connection between the peripheral device 110 and the device connection unit 230. A technique to check whether any peripheral device is connected to the 20-pin standard terminal, the 3.5 mm jack, etc., or the like is well known in the art. So, related descriptions will be omitted herein.

The mode control unit 270 controls the communication unit 220, depending on detection results of the connection detection unit 260. For example, if the connection detection unit 260 detects a connection between the peripheral unit 110 and the device connection unit 230, the mode control unit 270 controls the communication unit 220 to operate in a data receive mode. If the connection detection unit 260 detects a disconnection occurs between the peripheral unit 110 and the device connection unit 230, the mode control unit 270 controls the communication unit 220 to operate in a control receive mode. The mode control unit having at least two modes comprising a first mode configured to control the communication unit to send the received data signal to the data processing unit when the connection detection unit detects the connection of the peripheral device and a second mode that is activated when the connection detection unit detects there is no detection with the peripheral device.

In the data receive mode, the communication unit 220 receives a data signal from the client device 120 via antenna 210 and delivers it to the data processing unit 240. Then the data processing unit 240 sends the received data signal to the peripheral device 110 via the device connection unit 230. In the control receive mode, the communication unit 220 receives a control signal from the client device 120 and delivers it to the operation control unit 280. Then, the operation control unit 280 controls the operation of the apparatus 100 according to the received control signal. Detailed processes in the data receive mode and in the control receive mode will now be described with reference to FIGS. 3 and 4.

Figure 3:
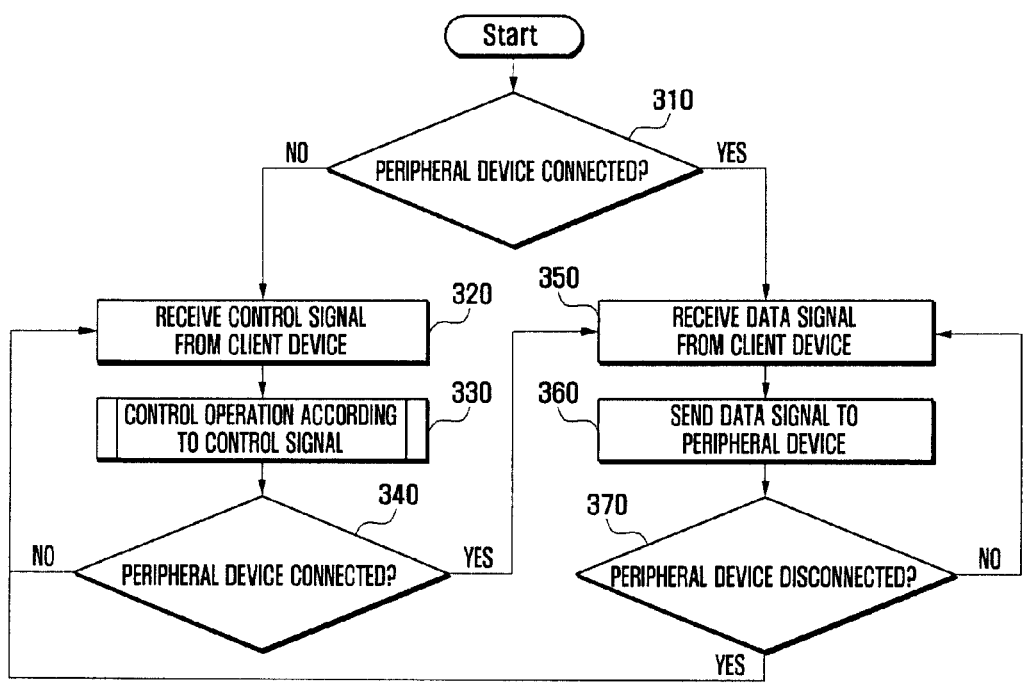
FIG. 3 is a flow diagram illustrating exemplary operation of a wireless signal processing method in accordance with an exemplary embodiment of the present invention.

FIG. 3 is a flow diagram illustrating exemplary operation of a wireless signal processing method in accordance with an exemplary embodiment of the present invention.

In step 310, the connection detection unit 260 determines whether the peripheral device 110 is connected to the device connection unit 230. If the peripheral device 110 is connected to the device connection unit 230, the apparatus 100 begins to perform step 350 to operate in a data receive mode. Otherwise, if the peripheral device 110 is not connected to the device connection unit 230, the apparatus begins to perform step 320 to operate in a control receive mode.

In the data receive mode, the communication unit 220 can receive only a data signal and cannot receive a control signal. Steps 350 to 370 indicate the operation in the data receive mode.

In step 350, the communication unit 220 receives a data signal from the client device 120 and sends it to the data processing unit 240. Using HFP (Hands-Free Profile) or A2DP (Advanced Audio Distribution Profile) of Bluetooth, for example, the communication unit 220 may receive a data signal from the client device 120. In this case, the communication unit 220 enters into a state capable of receiving a data signal only using HFP or A2DP. Additionally, in the data receive mode, the communication unit 220 ignores or rejects a signal with other profiles for receiving a control signal to be discussed later. Depending on the exemplary embodiments, communication allowable profiles and disallowable profiles may be varied respectively. However, it may not depend on embodiments in which allowable profiles are varied when a change in mode occurs. In a Bluetooth communication, the apparatus 100 acts as a hardware server processor device, whereas the client device 120 acts as a client that can access the hardware server device (apparatus 100) and send a data signal to the apparatus 100.

In step 360, the data processing unit 240 converts the received data signal into a specific format which can be recognized by the peripheral device 110, and sends it to the peripheral device 110. Then the peripheral device 110 may offer the received data to a user or process the received data in any proper form. In step 370, the connection detection unit 260 determines whether the peripheral unit 110 is disconnected. If the peripheral unit 110 is still connected, a process flow returns to the step 350 and repeats then the above-discussed steps 350, 360 and 370 in the data receive mode. However, if the connection detection unit 160 detects a disconnection of the peripheral device 110, the apparatus 100 then performs the step 320 and then operates in the control receive mode. Namely, the apparatus 100 operates in the data receive mode while a connection of the peripheral device 110 is maintained, but operates in the control receive mode when the peripheral device 110 is disconnected.

In the data receive mode, the transmission of a data signal is not limited to a path from the client device 120 to the peripheral device 110 through the apparatus 100. For example, if the client device 120 is a smart phone and performs a call function through an earset as an example of the peripheral device 110, it may be necessary to deliver audio data inputted through a microphone of the earset to the smart phone. In the aforementioned case, as delivered from the client device 120 to the peripheral device 110 through the apparatus 100, a data signal may be delivered from the peripheral device 110 to the client device 120 through the apparatus 100. Namely, the apparatus 100 may allow for two-way transmission of a data signal. In addition, the communication unit 220 may receive a data signal from the peripheral device 110 and send it to the client device 120 only when the peripheral device 110 is connected to the device connection unit 230.

Unlike when the apparatus is in the data receive mode, when the apparatus is in the control receive mode the communication unit 220 can receive only a control signal and cannot receive a data signal. In step 320, the communication unit 220 receives a control signal from the client device 120. Using SPP (Serial Port Protocol) of Bluetooth, for example, the communication unit 220 may receive a control signal from the client device 120. A control signal is used for controlling the operation of the apparatus 100. If the apparatus 100 comprises, for example, a wirelessly controlled car, a control signal may include, for example, a steering signal, a speed control signal, and a lamp on/off signal. The communication unit 220 delivers the received control signal to the operation control unit 280.

In the control receive mode, the communication unit 220 enters into a state that can receive a control signal only using SPP. Additionally, when in the control receive mode, the communication unit 220 preferably ignores or rejects a signal using the above-mentioned HFP or A2DP. Depending on embodiments, communication allowable profiles and disallowable profiles may be varied respectively. However, some embodiments may not have allowable profiles that are varied when a change in mode occurs. In a Bluetooth communication, the apparatus 100 preferably comprises a type of a hardware server processor, whereas the client device 120 comprises a client hardware device that can access the apparatus 100 and deliver a control signal to the apparatus 100. For example, a portable communication terminal may comprise the client device 120.

In step 330, the operation control unit 280 controls the operation of the apparatus 100 according to the received control signal(s). Now, the function of the operation control unit 280 will be described with reference to FIG. 4.

Figure 4:
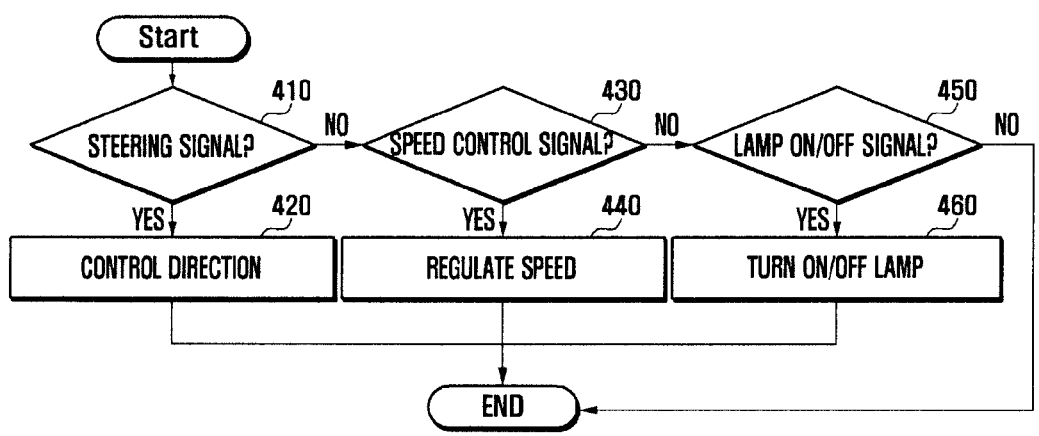
FIG. 4 is a flow diagram illustrating exemplary operation in detail the step 330 shown in FIG. 3.

FIG. 4 is a flow diagram illustrating in detail the step 330 shown in FIG. 3.

For explanatory purposes, it is assumed herein that the operation control unit 280 can receive and process a steering signal, a speed control signal, and a lamp on/off signal (i.e. items associated with operation of the apparatus 100).

In step 410, the operation control unit 280 determines whether the received control signal comprises a steering signal. If so, in step 420 the operation control unit 280 controls the direction of the apparatus 100 according to the received steering signal. If the received control signal is not a steering signal, in step 430 the operation control unit 280 further determines whether the received signal is a speed control signal. If so, in step 440 the operation control unit 280 regulates the speed of the apparatus 100 according to the received speed control signal. If the received control signal is not a speed control signal, in step 450 the operation control unit 280 further determines whether the received signal is a lamp on/off signal. If so, in step 460 the operation control unit 280 turns on or off a lamp of the apparatus 100 according to the received lamp on/off signal. If the received control signal is not a lamp on/off signal, the operation control unit 280 finishes a control process since the received control signal is not available for the operation control unit 280. A person of ordinary skill in the art should understand and appreciate that with regard to the claimed invention, the determinations made in steps 410, 430 and 450 can be made in a different order by the operation control unit 280.

Although relying on the assumption that the apparatus 100 is a wirelessly controlled car, the above discussion in FIG. 4 is exemplary only and not to be considered as a limitation of the present invention. For example, other types of wirelessly controlled items (i.e. a plane, helicopter, tank, amphibious vehicle, robot or any other various devices or equipment having any other functions) may be alternatively used as the apparatus 100 of this invention. In case of the latter cases, other types of control signals associated with operation of the particular apparatus would be applied that can include functions other than the exemplary functions of steering, speed control, lamps, etc.

The operation of the apparatus 100 that can be controlled by the operation control unit 280 may include mechanically-related operations such as the regulation of a rotation speed or direction of wheels (in case of a toy car), the regulation of arm/leg/neck motions (in case of a toy robot), or the regulation of a propeller rotation speed or wings (in case of a toy plane), and may also include manipulations causing visual or auditory effects such as lamp on/off or sound output. The apparatus comprises a wirelessly controlled apparatus in which the first and second modes of the mode control unit are changeable according to the connection and disconnection of the peripheral device.

Returning now to FIG. 3, in step 340, the connection detection unit 260 determines whether the peripheral device 110 is connected. If the peripheral device 110 is not connected, a process flow returns to the step 320 and then repeats the above-discussed steps 320, 330 and 340 in the control receive mode. However, if the peripheral device 110 is connected, the apparatus 100 performs the step 350 and then operates in the data receive mode.

As discussed hereinbefore, the wireless signal processing apparatus 100 selectively operates in the data receive mode or control receive mode according to whether the apparatus detects being connected with or disconnected with the peripheral device 110. Depending on the mode, various protocols and signals can be processed by the communication unit 220. Accordingly, the present invention may have the effect of allowing a user to easily change the use of the apparatus 100 by merely connecting (coupling) with or disconnecting (decoupling) from the peripheral device 110.

Figure 5:
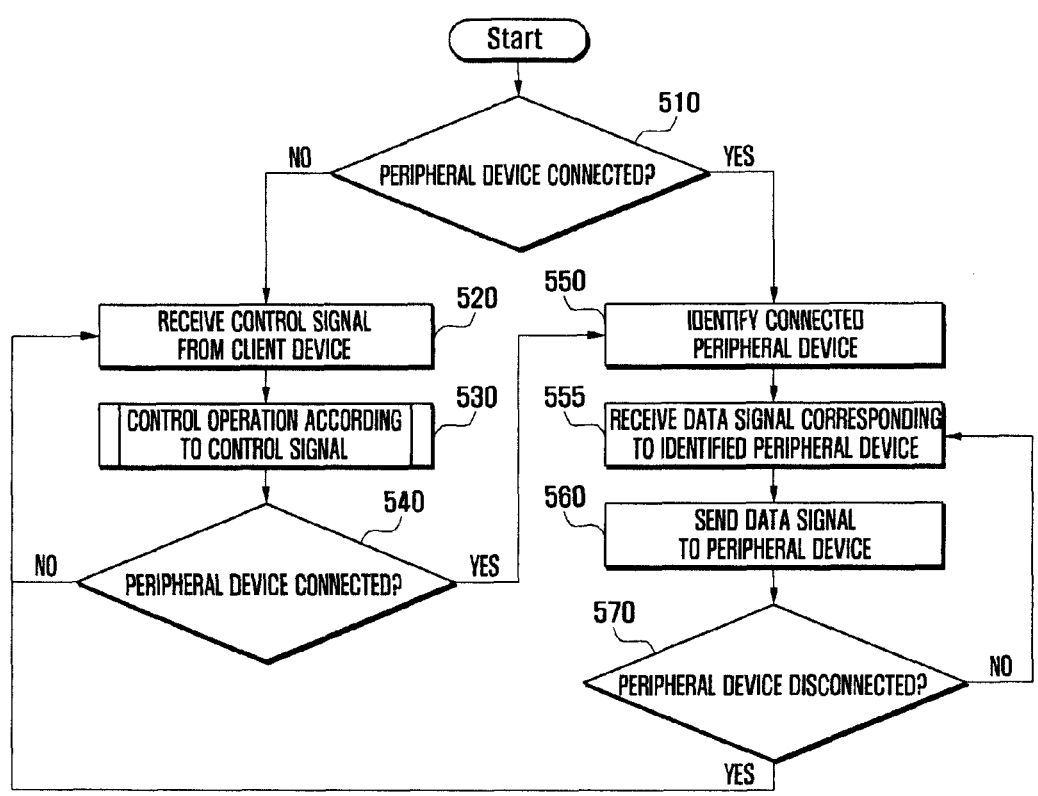
FIG. 5 is a flow diagram illustrating exemplary operation of a wireless signal processing method in accordance with another exemplary embodiment of the present invention.

FIG. 5 is a flow diagram illustrating a wireless signal processing method in accordance with another exemplary embodiment of the present invention.

Steps 510, 520, 530 and 540 in FIG. 5 correspond to the above-discussed steps 310, 320, 330 and 340 in FIG. 3, respectively, so the repetition of descriptions will be avoided hereinafter.

In step 550, the connection detection unit 260 identifies the type of the connected (i.e. coupled) peripheral device 110. For instance, the type of the peripheral device 110 may be one of an audio receive-only device (such as an earphone or a headphone), an audio interactive device (such as an earset or a headset having a microphone), a video receive-only device (such as a display), and a video interactive device (such as a display with a webcam).

Table 1 exemplarily shows types of the peripheral devices 110.

TABLE 1

| Type ID | Audio | Video | The Others | Example |
|---|---|---|---|---|
| 1 | Receive Only | X | X | Earphone, Headphone |
| 2 | Interactive | X | X | Earset, Headset (Microphone + Earphone) |
| 3 | Send Only | X | X | Microphone |
| 4 | X | Receive Only | X | Monitor |
| 5 | Receive Only | Receive Only | X | TV, Monitor with Speaker |
| 6 | Interactive | Interactive | X | Webcam + Monitor + Microphone + Earphone |
| 7 | X | X | File | File Storage |

In step 555, the mode control unit 270 receives a data signal relying on the type of the peripheral device 110.

Specifically, the mode control unit 270 determines what kind of data can be sent or received by the peripheral device 110, depending on the identified type of the peripheral device 110.

For instance, if an earphone or a headphone is connected to the apparatus 100, the communication unit 220 can receive audio data by using a Bluetooth profile that allows an audio data reception. For example, A2DP is one of audio data receivable profiles. Any other profiles through which the peripheral device 110 sends audio data or sends/receives video data are not allowed. If an earset or a headset is connected to the apparatus 100 or if an earphone and a microphone are connected together to the apparatus 100, the communication unit 220 can send/receive audio data by using a profile that allows an audio data transmission/reception. For example, HFP is one of audio data transmissible/receivable profiles. If a monitor or a projector that can receive and display video data is connected as the peripheral device 110, the communication unit 220 can receive vide data by using a suitable profile. Profiles adapted to the respective peripheral devices 110 may be set up in advance by a manufacturer or selected by a user.

If a new peripheral device is connected or the type of the peripheral device 110 is changed during a wireless signal processing, profiles supported by the communication unit 220 may be changed accordingly. Moreover, it is within the spirit and scope of the claimed invention that the mode control unit may have more than two modes, with, for example the type of mode based on the type of peripheral device.

In some exemplary embodiments, if parts of functions supported by the peripheral device 110 are needed for a specific profile, the communication unit 220 may receive a data signal of that profile. For instance, if "a webcam, a monitor, a microphone and an earphone" are connected to the apparatus 100 as shown in type ID 6 of Table 1 the peripheral device 110 can perform a two-way communication of both audio and video. However, even in this case, the communication unit 220 can receive a data signal based on A2DP or HFP and then deliver it to the peripheral device 110.

Although the above discussion is based on Bluetooth profiles, this is exemplary only and not to be considered as a limitation of the present invention. Alternatively, this invention may be applied to any other short-range wireless communications.

Steps 560 and 570 correspond to the above-discussed steps 360 and 370, respectively, so the repetition of descriptions will be avoided hereinafter.

The present invention is described herein with reference to flowchart illustrations of user interfaces, methods, and computer program products according to embodiments of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks. These computer program instructions may also be stored in a computer usable or computer-readable non-transitory memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

Each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The above-described methods according to the present invention can be realized in hardware or as software or computer code that can be stored in a non-transitory recording medium such as a CD ROM, a RAM, thumbnail drive, a floppy disk, a flash storage, a hard disk, or a magneto-optical disk or downloaded over a network and stored in storage, so that the methods described herein can be executed by such software using a general purpose computer, special computer, microprocessor, special processor, or in a programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Moreover, the term "unit", as used herein, means, but is not limited to, a software or hardware component, such as a Field Programmable Gate Array (FPGA) or Application Specific Integrated Circuit (ASIC), which performs certain tasks. A unit may advantageously be configured to reside on the addressable storage medium and configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units.

While this invention has been particularly shown and described with reference to an exemplary embodiment thereof, it will be understood by those skilled in the art that various changes in form and details may be made therein without departing from the spirit and scope of the invention as defined by the appended claims.

What is claimed is:

1. A wireless signal processing apparatus of a wireless control vehicle using a short-range wireless communication, the apparatus comprising:
    a connection detection unit configured to detect a connection of a peripheral device;
    a communication unit configured to receive a control signal and a data signal from a user-device through the short-range wireless communication, the received signal being not in a specific format for processing by the peripheral device;
    an operation control unit configured to receive the control signal including a steering control signal for the wireless control vehicle, and to control a direction of the wireless control vehicle based on the control signal;
    a data processing unit configured to convert the format of the received data signal into the specific format adapted to the peripheral device and send the converted received data signal to the peripheral device; and
    a mode control unit configured to :
        control the communication unit to send the received data signal to the data processing unit when the connection detection unit detects the connection of the peripheral device, and
        control the communication unit to send the received control signal to the operation control unit when the connection detection unit does not detect connection of the peripheral device,
    wherein the control signal and the data signal are processed based on the detection of the connection of the peripheral device.

2. The apparatus of claim 1, wherein operations of the mode control unit are changeable according to the connection and disconnection of the peripheral device.

3. The apparatus of claim 1, wherein the user-device comprises a client device.

4. The apparatus of claim 3, where the client device comprises a portable communication terminal.

5. The apparatus of claim 1,
    wherein the operation control unit further configured to control an operation of the apparatus according to the received control signal,
    wherein the mode control unit is further configured to control the communication unit to send the received control signal to the operation control unit when the connection detection unit fails to detect the connection of the peripheral device.

6. The apparatus of claim 5, wherein the mode control unit is further configured to control the communication unit to receive the data signal by using Hands-Free Profile (HFP) or Advanced Audio Distribution Profile (A2DP) of Bluetooth when the connection detection unit detects the connection of the peripheral device.

7. The apparatus of claim 5, wherein the mode control unit is further configured to control the communication unit to receive the control signal by using a Serial Port Profile (SPP) of Bluetooth when the connection detection unit fails to detect the connection of the peripheral device.

8. The apparatus of claim 5, wherein the connection detection unit is further configured to identify the type of the peripheral device when detecting the connection of the peripheral device, and
    wherein the mode control unit is further configured to control the communication unit to receive the data signal corresponding to the identified type of the peripheral device.

9. The apparatus of claim 1, wherein the operation control unit is further configured to receive at least one of a speed control signal and a lamp on/off signal, and wherein the operation control unit controls regulate a speed or turn on/off a lamp of the apparatus according to the received control signal.

10. A wireless signal processing method using a short-range wireless communication in a wireless signal processing apparatus of a wireless control vehicle, the method comprising:

determining by a control unit of an apparatus whether a peripheral device is coupled to a peripheral device connection unit;

when a coupling of the peripheral device is detected by the control unit, controlling, by a mode control unit, a communication unit of the apparatus to send a data signal received from a user-device to a data processing unit of the apparatus, the received data signal being not in a specific format for processing by the peripheral device;

when the communication unit receives the data signal, converting, by the data processing unit, the format of the data signal to the specific format adapted to the peripheral device and sending the converted data signal by the apparatus to the peripheral device;

when a coupling of the peripheral device is not detected by the control unit, controlling, by the mode control unit, the communication unit to send a received control signal received from the user-device to an operation control unit;

controlling, by the operation control unit, a direction of the wireless control vehicle based on the control signal including a steering control signal for the wireless control vehicle, wherein the control signal and the data signal are processed based on the detection of the connection of the peripheral device.

11. The method of claim 10, wherein the user-device comprises a portable communication terminal.

12. The method of claim 10, wherein the user-device comprises a client device, and the control unit comprises a server.

13. The method of claim 10, wherein the receiving of the data signal includes receiving the data signal by using Hands-Free Profile (HFP) or Advanced Audio Distribution Profile (A2DP) of Bluetooth when the coupling with the peripheral device is detected.

14. The method of claim 10, wherein the receiving of the control signal includes receiving the control signal by using Serial Port Profile (SPP) of Bluetooth when the coupling with the peripheral device is not detected.

15. The method of claim 10, further comprising:
identifying by the control unit the type of the peripheral device when detecting the coupling with the peripheral device,
wherein the receiving of the data signal includes receiving the data signal corresponding to the identified type of the peripheral device.

16. The method of claim 10, wherein the receiving the control signal includes receiving at least one of a speed control signal, and a lamp on/off signal.

17. The method of claim 16, wherein the controlling of the operation of the apparatus includes one or more of controlling regulating a speed or turning on/off a lamp of the apparatus according to the received control signal.

18. The method of claim 10, wherein a mode control unit determines whether to enable a communication unit to receive data signals in a first mode or control signals in a second mode.

19. A wireless signal processing apparatus of a wireless control vehicle using a short-range wireless communication, the apparatus comprising:
a connection detection unit configured to detect a connection of a peripheral device;
a communication unit configured to receive a control signal and a data signal from a user- device through the short-range wireless communication, the received data signal being not in a specific format for processing by the peripheral device;
an operation control unit configured to receive the control signal including a steering control signal for the wireless control vehicle, and to control a direction of the wireless control vehicle based on the control signal;
a data processing unit configured to convert the format of the received data signal into the specific format adapted to the peripheral device and send the converted received data signal to the peripheral device; and
a mode control unit configured to:
control the communication unit to send the received data signal to the data processing unit when the connection detection unit detects the connection of the peripheral device, and
control the communication unit to send the received control signal to the operation control unit and avoid processing the received data signal when the connection detection unit does not detect connection of the peripheral device,
wherein the mode control unit identifies a type of the peripheral device and determines what kind of data can be sent the peripheral device or received by the peripheral device based on the identified type of the peripheral device when the connection detection unit detects the connection of the peripheral device.

* * * * *